United States Patent
Shvodian (10) Patent No.: US 11,595,962 B1
(45) Date of Patent: Feb. 28, 2023

(54) USE OF NETWORK SIGNALING (NS) VALUES TO COOPERATIVELY CONTROL SPECTRAL EMISSION AND ADDITIONAL FUNCTIONALITY SUCH AS UPLINK/DOWNLINK SUBCARRIER SHIFTING

(71) Applicant: Sprint Spectrum L.P., Overland Park, KS (US)

(72) Inventor: William Shvodian, McLean, VA (US)

(73) Assignee: Sprint Spectrum LLC, Bellevue, WA (US)

( * ) Notice: Subject to any disclaimer, the term of this patent is extended or adjusted under 35 U.S.C. 154(b) by 44 days.

(21) Appl. No.: 17/443,086

(22) Filed: Jul. 20, 2021

Related U.S. Application Data (60) Provisional application No. 62/706,694, filed on Sep. 3, 2020.

(51) Int. Cl.
| | |
|---|---|
| *H04W 72/04* | (2009.01) |
| *H04L 5/00* | (2006.01) |
| *H04W 48/10* | (2009.01) |
| *H04W 72/12* | (2009.01) |

(52) U.S. Cl.
CPC ........... *H04W 72/048* (2013.01); *H04L 5/001* (2013.01); *H04L 5/0053* (2013.01); *H04W 48/10* (2013.01); *H04W 72/1247* (2013.01)

(58) Field of Classification Search
None
See application file for complete search history.

(56) References Cited

U.S. PATENT DOCUMENTS

| | | |
|---|---|---|
| 8,391,141 B2 | 3/2013 | Rune et al. |
| 8,731,606 B2 | 5/2014 | Yoshihara et al. |
| 8,929,907 B1 | 1/2015 | Vargantwar et al. |
| 9,894,602 B1 | 2/2018 | Manchanda et al. |
| 9,912,450 B2 | 3/2018 | McNamara et al. |
| 10,070,440 B2 | 9/2018 | McNamara et al. |
| 10,206,162 B2 | 2/2019 | Van Der Velde et al. |
| 10,341,933 B1 | 7/2019 | Parihar et al. |
| 10,542,475 B1 | 1/2020 | Singh et al. |

(Continued)

OTHER PUBLICATIONS

3GPP 3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.7.0 (Sep. 2019).

*Primary Examiner* — Hong S Cho
(74) *Attorney, Agent, or Firm* — McDonnell Boehnen Hulbert & Berghoff LLP (57) ABSTRACT

A method and system to help prevent legacy devices that do not support a service feature such as uplink-downlink subcarrier shifting from connecting with an access node on a carrier where the service feature should be applied. An example method involves use of Network Signaling (NS) values that are used for spectral emission control. Per the disclosure, the access node could broadcast an NS value that legacy device are not configured to understand but that newer devices are configured to understand as relating to both spectral emission limitation and also the service feature at issue. Responsive to the broadcast of that NS value, the legacy devices will therefore not connect with the access node, while the newer devices may connect with the access node and apply the service feature.

20 Claims, 5 Drawing Sheets

(56) References Cited

U.S. PATENT DOCUMENTS

| | | |
|---|---|---|
| 10,932,302 B1 | 2/2021 | Shvodian |
| 2006/0198350 A1 | 9/2006 | Kim |
| 2009/0122782 A1 | 5/2009 | Horn et al. |
| 2009/0131110 A1 | 5/2009 | Balachandran et al. |
| 2010/0067436 A1 | 3/2010 | Kouda et al. |
| 2012/0307739 A1 | 12/2012 | Ishihara et al. |
| 2013/0003627 A1* | 1/2013 | Kravtsov .......... H04W 52/0209 370/311 |
| 2013/0100924 A1 | 4/2013 | Striuli et al. |
| 2015/0327133 A1 | 11/2015 | Yiu et al. |
| 2016/0157170 A1 | 6/2016 | Daoud Triki et al. |
| 2017/0019802 A1 | 1/2017 | Ode |
| 2017/0367036 A1 | 12/2017 | Chen et al. |
| 2018/0063841 A1 | 3/2018 | Song et al. |
| 2018/0270677 A1 | 9/2018 | Brisebois et al. |
| 2019/0037417 A1 | 1/2019 | Lei et al. |
| 2019/0104551 A1* | 4/2019 | Deenoo ............. H04W 72/0446 |

* cited by examiner

Fig. 1

ON A FIRST CARRIER ON WHICH A GIVEN SPECTRAL EMISSION LIMIT IS TO BE APPLIED AND AN UPLINK-DOWNLINK SUBCARRIER SHIFTING IS NOT TO BE APPLIED, BROADCAST A FIRST NS VALUE THAT A SET OF MAPPING DATA RESPECTIVELY OF EACH UE OF A FIRST CLASS AND EACH UE OF A SECOND CLASS (i) CORRELATES WITH APPLICATION OF THE SPECTRAL EMISSION LIMIT AND (ii) DOES NOT CORRELATE WITH APPLICATION OF THE UPLINK-DOWNLINK SUBCARRIER SHIFTING ⟶ 28

ON A SECOND CARRIER ON WHICH THE SPECTRAL EMISSION LIMIT IS TO BE APPLIED AND THE UPLINK-DOWNLINK SUBCARRIER SHIFTING IS TO BE APPLIED, BROADCAST A SECOND NS VALUE THAT (i) THE SET OF MAPPING DATA RESPECTIVELY OF EACH UE OF THE FIRST CLASS CORRELATES WITH APPLICATION OF THE SPECTRAL EMISSION LIMIT AND WITH APPLICATION OF THE UPLINK-DOWNLINK SUBCARRIER SHIFTING AND (ii) THE SET OF MAPPING DATA RESPECTIVELY OF EACH UE OF THE SECOND CLASS DOES NOT INCLUDE ⟶ 30

Fig. 2

```
┌─────────────────────────────────────┐
│ ON A FIRST CARRIER ON WHICH A GIVEN SPECTRAL │
│ EMISSION LIMIT IS TO BE APPLIED AND A GIVEN SERVICE │
│ FEATURE IS NOT TO BE APPLIED, BROADCAST A FIRST NS │
│ VALUE THAT A SET OF MAPPING DATA RESPECTIVELY OF │──── 32
│ EACH UE OF A FIRST CLASS AND EACH UE OF A SECOND │
│ CLASS (i) CORRELATES WITH APPLICATION OF THE │
│ SPECTRAL EMISSION LIMIT AND (ii) DOES NOT CORRELATE │
│ WITH APPLICATION OF THE SERVICE FEATURE │
└─────────────────────────────────────┘

┌─────────────────────────────────────┐
│ ON A SECOND CARRIER ON WHICH THE SPECTRAL │
│ EMISSION LIMIT IS TO BE APPLIED AND THE SERVICE │
│ FEATURE IS TO BE APPLIED, BROADCAST A SECOND NS │
│ VALUE THAT (i) THE SET OF MAPPING DATA RESPECTIVELY │
│ OF EACH UE OF THE FIRST CLASS CORRELATES WITH │
│ APPLICATION OF THE SPECTRAL EMISSION LIMIT AND │──── 34
│ WITH APPLICATION OF THE SERVICE FEATURE AND (ii) THE │
│ SET OF MAPPING DATA RESPECTIVELY OF EACH UE OF │
│ THE SECOND CLASS DOES NOT INCLUDE │
└─────────────────────────────────────┘
```

USE OF NETWORK SIGNALING (NS) VALUES TO COOPERATIVELY CONTROL SPECTRAL EMISSION AND ADDITIONAL FUNCTIONALITY SUCH AS UPLINK/DOWNLINK SUBCARRIER SHIFTING

REFERENCE TO RELATED APPLICATION

This application claims priority to U.S. Provisional Patent Application No. 62/706,694, filed Sep. 3, 2020, the entirety of which is hereby incorporated by reference.

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in RF spectrum) having a bandwidth and a center frequency and thus extending from a low-end frequency to a high-end frequency.

Each such carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, n261, and n262, supporting TDD carriers, among numerous other possibilities.

Further, on the downlink and uplink channels, the coverage of each access node could define an air interface configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry synchronization signals that UEs could detect as an indication of the presence of coverage and to establish frame timing, those or other resource elements could function as or be reserved to carry a reference signal that UEs could measure in order to determine coverage strength, and still other resource elements could be reserved to carry other control signaling such as PRB-scheduling directives and acknowledgement messaging from the access node to served UEs. And on the uplink, certain resource elements could be reserved to carry random access signaling from UEs to the access node, and other resource elements could be reserved to carry other control signaling such as PRB-scheduling requests and acknowledgement signaling from UEs to the access node.

OVERVIEW

When a UE enters into coverage of an example network, the UE could scan for and detect coverage of an access node on a carrier. With the example air-interface configuration described above, for instance, the UE could scan one or more predefined carrier frequencies in search of a synchronization signal indicating the presence of coverage on a carrier. Upon finding such coverage, the UE could then read one or more broadcast messages on the carrier, in order to determine operational parameters related to service on the carrier. And the UE could evaluate the reference signal on the carrier, in order to determine coverage strength.

Upon determining that the coverage on the carrier is sufficiently strong to justify connecting (e.g., at least predefined threshold strong), the UE could then engage signaling to connect with the access node. For instance, the UE could initiate random-access signaling with the access node and could then engage in Radio Resource Control (RRC) signaling with the access node to establish an RRC connection through which the access node will then serve the UE. Further, if the UE is not already registered for service with the core network, the UE could transmit to the access node an attach request, which the access node could forward to a core-network controller for processing. And the core-network controller could then coordinate setup for the UE of one or more bearers extending between the UE and a core-network gateway that provides transport-network connectivity.

Once the UE is so connected and registered, the access node could then serve the UE in a connected mode, managing downlink air-interface communication of packet data to the UE and uplink air-interface communication of packet data from the UE.

For example, when packet data for the UE arrives at the core network from a transport network, the data could flow to the UE's serving access node, and the access node could then schedule and provide transmission of that data to the UE on particular downlink PRBs of the UE's serving carrier. Likewise, when the UE has data to transmit on the transport network, the UE could transmit a scheduling request to the access node, the access node could responsively schedule transmission of that data from the UE on particular uplink PRBs of the UE's serving carrier, and the UE could accordingly transmit the data to the access node for forwarding through the core network to the transport network.

As the industry advances from one generation of wireless technology to the next or from one version of wireless technology to another, wireless service providers may upgrade their access nodes to support new and useful service features. Further, wireless service providers and/or others may offer new and improved UEs that are configured with hardware and/or software designed to support these service features.

Unfortunately, however, legacy UEs or other less-advanced UEs may not support some or all of such new service features. For instance, legacy UEs may lack hardware components (e.g., certain advanced RF components) that may be required to facilitate use of the latest features. And legacy UEs may lack software or other control logic that may be required to facilitate use of the latest features.

In some cases, this may not be a significant problem, as UEs that do not support certain new service features may simply not make use of those features and thus not benefit from those features. However, in some situations, when a UE does not support a feature of an access node's service, it may be best for the UE to avoid being served by the access node altogether.

Without limitation, an example of this situation is where an access node provides service on a carrier that is configured with a special subcarrier configuration but where a legacy UE operates with an older subcarrier configuration according to a legacy specification and does not include control logic supporting the new subcarrier configuration, and where the legacy specification does not specify the UE behavior when an unsupported configuration is indicated. In that situation, if the UE connects with the access node and the access node serves the UE, the UE may attempt to communicate using the older subcarrier configuration, but doing so may create interference or other service problems. Therefore, it may be best for such a UE to not be served by the access node at all, perhaps to instead be served by a different access node.

For instance, for certain network configurations, it is important for served UEs to operate with a 7.5 kHz shift in subcarrier alignment between downlink (DL) and uplink (UL), in order to help avoid interference problems, but legacy UEs that are not configured with logic to support such subcarrier shifting for certain bands, for instance TDD bands, may operate on such bands without applying the 7.5 kHz shift, thereby creating the interference issue.

Namely, on a carrier in such a band, an access node may broadcast a codeword to which UEs should respond by applying the 7.5 kHz shift. Newer UEs may possess logic that causes them to respond to that codeword by applying the 7.5 kHz shift. But legacy UE may not possess logic that defines that codeword or necessary hardware. Therefore, when a legacy UE receives the codeword broadcast by an access node on a carrier, the behavior when that codeword is received on that band would be undefined from the legacy UE's perspective, and the legacy UE may therefore attempt to connect with the carrier and would not apply the 7.5 kHz shift, which can create undesired interference.

With this example, at issue is then how to prevent a legacy UE from connecting on a carrier that requires the 7.5 kHz shift, given that legacy UEs are not configured with logic that enables the UEs to respond to directives regarding the 7.5 kHz shift. Further, the same issue could apply with respect to other subcarrier shifts and with respect to other UE behavior as well.

Disclosed herein is a mechanism to help avoid having a UE connect with an access node in a scenario where the UE lacks support for a service feature of the access node, and particularly where the UE lacks knowledge and understanding of the service feature (e.g., where the UE is not programmed with logic regarding the service feature). By way of example, and without limitation, the description can facilitate preventing legacy UEs that do not have logic to support a relatively newly introduced subcarrier configuration, such as the above-noted 7.5 kHz subcarrier shift for TDD bands, from connecting with an access node on a carrier on which that subcarrier configuration should be applied. For simplicity, also without limitation, the present description may focus on that example.

The disclosed mechanism makes use of Network Signaling (NS) functionality that both legacy UEs and newer UEs would support.

Standards define NS values that indicate certain functionality that served UEs should apply. On a carrier in a given band, an access node would broadcast one or more such NS values, in a System Information Block (SIB) message for instance, to cause UEs served by the access node on that carrier to apply functionality associated with a given such NS value.

In particular, NS values are used to help control spectral emissions, such as RF leakage from one band into an adjacent band, by directing or allowing served UEs to attenuate their respective uplink transmission power under certain circumstances. For instance, an access node might provide an NS value to UEs being served by the access node, and the NS value may correspond to an amount by which the UEs may attenuate their uplink transmission power to meet the spectral emission requirement.

In one example configuration, for UEs operating on carriers where specific regulatory requirements regarding spectral emissions do not apply, the access node may provide, by default, an NS_01 value corresponding to zero attenuation. Accordingly, the UEs operating on those carriers may operate using a default maximum uplink transmission power. On the other hand, for UEs operating on carriers where specific regulatory requirements do apply, the access node may provide a different NS value, such as an NS_03 value, an NS_04 value, or an NS_06 value indicating a specific emission requirement applies, and for these NS values, there are corresponding particular amounts of attenuation (e.g., 3 dB, 5 dB, 10 dB, etc.) by which UEs may reduce their default maximum transmission power.

Standards or regulations may designate one or more NS values that are permissible to have an access node broadcast per band. For instance, standards or regulations specify three possible NS values that could be broadcast on carriers in a particular band: (i) No NS value, or an empty, null, NS_01, or another NS value, correlated with just baseline functionality, (ii) NS_03, which might correlate with certain spectral emission limitations, and (iii) NS_44, which might correlate with other or additional spectral emission limitations.

In general, UEs are provisioned with logic that maps each of various NS values with the associated functionality, to allow the UEs to carry out associated functionality as to service on a carrier upon detecting broadcast of a given NS value on that carrier. Namely, when a UE is considering connecting with an access node on a given carrier, the UE could read the one or more NS values that the access broadcasts in the SIB on that carrier and look for the first such broadcast NS value as to which the UE is provisioned with associated logic. The UE could thus map the NS value broadcast in that SIB message to the associated functionality that the UE is provisioned to apply and, upon connecting with the access node on that carrier cell, could then operate with that associated functionality.

As the industry advances and new NS values are introduced, older UEs may not possess logic mapping those new NS values with associated functionality. By standard, if a UE does not have logic correlated with any of the one or more NS values that an access node broadcasts on a given carrier, the UE will not connect with the access node on that carrier—in order to avoid operating on the carrier without applying the functionality that is associated with the NS value(s). Thus, when a UE is considering connecting with an access node on a given carrier, the UE will read the one or more NS values that the access node broadcasts in the SIB on that carrier, and (i) if the UE has logic correlated with at least one of the one or more broadcast NS values, then the UE will apply that logic when served by the access node on that carrier, but (ii) if the UE does not have logic correlated with any of the one or more broadcast NS values, then the UE will forgo connecting with the access node on that carrier and may instead seek to connect in another cell.

The presently disclosed mechanism leverages this NS functionality, where a UE that does not have logic correlated with any of the NS values that an access node broadcasts on a carrier will determine that the UE does not have such logic and will therefore not connect with access node on the carrier.

Per the disclosure, new NS values could be defined in order achieve what existing NS values achieve and also (i) to allow new (non-legacy) UEs to implement the 7.5 kHz shift, because the UEs would possess logic associated with the NS values and the 7.5 kHz uplink shift indication in the SIB and (ii) to cause legacy UEs that do not support applying the 7.5 kHz uplink shift to not operate on the carrier at issue, because the legacy UEs would not possess associated logic.

With the particular band example above, for instance, where three NS values and associated functionality are already defined (e.g., NS_01, NS_03, and NS_44), three more corresponding NS values could be defined, which would be mapped to the same functionality as the three existing NS values but would additionally be mapped to application of the 7.5 kHz shift. As legacy UEs would not possess logic correlated with these new NS values, the legacy UEs would not connect on carriers where access nodes broadcast these new NS values. But newer UEs could be provisioned with logic correlated with these new NS values, so the newer UEs could connect on carriers where access nodes broadcast such an NS value and would respond to the NS value by carrying out the associated functionality, which would include the 7.5 kHz shift that is indicated in the SIB.

Accordingly, a method could be carried out in a wireless communication system that supports serving a plurality of UEs including a first class of UEs and a second class of UEs, where each UE of the plurality is programmed with a respective set of mapping data that correlates each of multiple NS values respectively with application of an associated spectral emission limit, and where each UE is configured such that, when the UE is within coverage of the system on a carrier, the UE receives one or more NS values broadcast by the system on the carrier and (i) if the UE's respective set of mapping data includes at least one of the one or more received NS values and the UE connects with the system on the carrier, then the UE applies the spectral emission limit that the UE's respective set of mapping data correlates with the received first NS value received that it supports and (ii) if the UE's respective set of mapping data does not include any of the received one or more NS values, then the UE avoids connecting with the access node on the carrier.

In particular, the method could provide for use of NS signaling to cooperatively control application of a given spectral emission limit and application of uplink-downlink subcarrier shifting. The method could include, on a first carrier on which the given spectral emission limit is to be applied and the uplink-downlink subcarrier shifting is not to be applied, the access node broadcasting a first NS value that the set of mapping data respectively of each UE of the first class and each UE of the second class (i) correlates with application of the spectral emission limit and (ii) does not correlate with application of the uplink-downlink subcarrier shifting. And the method could include, on a second carrier on which the spectral emission limit is to be applied and the uplink-downlink subcarrier shifting is to be applied, the access node broadcasting a second NS value that (i) the set of mapping data respectively of each UE of the first class correlates with application of the spectral emission limit and with application of the uplink-downlink subcarrier shifting and (ii) the set of mapping data respectively of each UE of the second class does not include.

Further, in line with the discussion above, this method could apply as well with respect to added functionality other than uplink-downlink subcarrier shifting.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of cellular wireless network operating according to 4G LTE and/or 5G NR, with UEs similarly equipped for such operation. It should be understood, however, that the principles disclosed herein could extend to apply with respect to other scenarios as well, such as with respect to one more other RATs. Further, it should be understood that other variations from the specific arrangements and processes described are possible. For instance, various described entities, connections, functions, and other elements could be added, omitted, distributed, re-located, re-ordered, combined, or changed in other ways.

As noted above, FIG. 1 is a simplified block diagram of an example wireless communication system in which various disclosed features can be implemented. In particular, the figure depicts a representative arrangement an example access node 12 configured to provide coverage and service on each of one or more carriers 14, and the figure depicts an example UE 16 within coverage of the access node.

Figure 1:
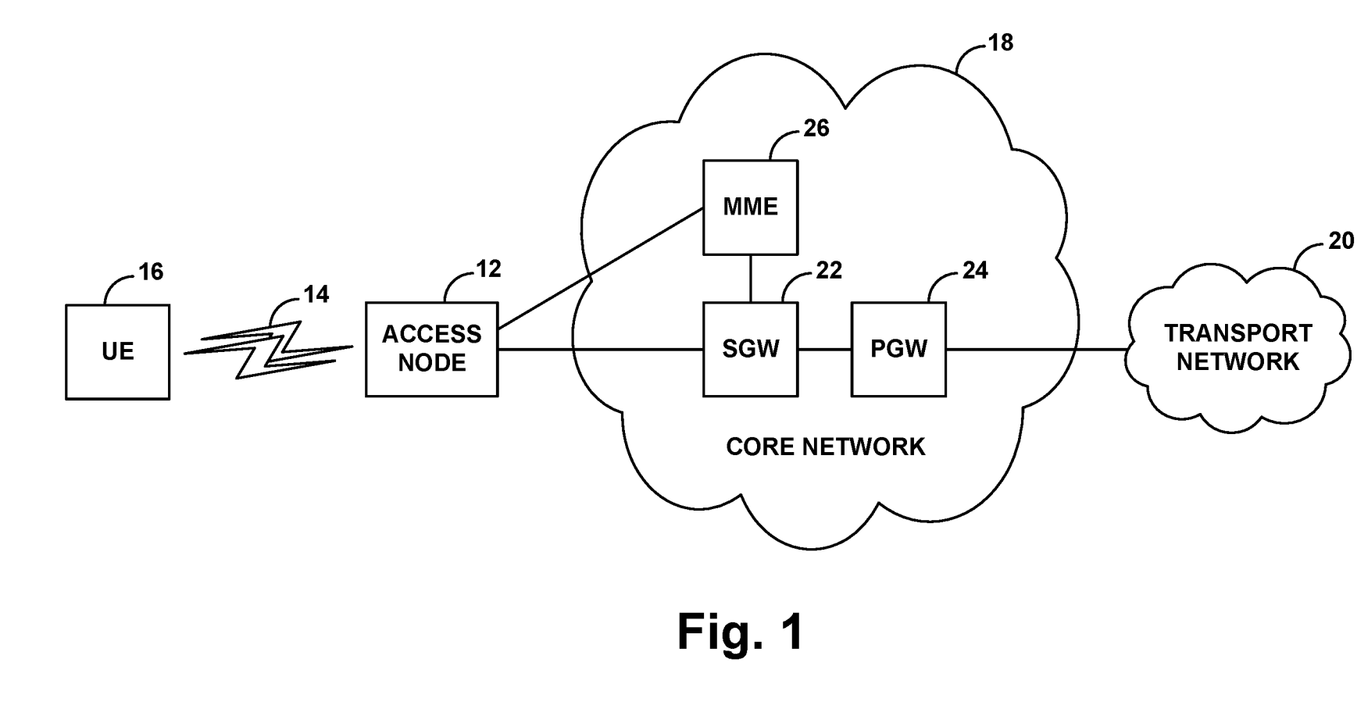
FIG. 1 is a simplified block diagram of an example wireless communication system in which various disclosed features can be implemented.

Access node 12 could be a macro access node of the type that would typically include a tower mounted antenna structure for providing a broad range of coverage. Or the access node could be a small cell access node, femtocell access node, relay access node, or other type of access node that might have a smaller form factor with an antenna structure that provides a narrower range of coverage, among other possibilities. And UE 16 could take any of the forms described above, also among other possibilities.

Access node 12 is shown coupled with an example core network 18. Core network 18 could be an evolved packet core (EPC) network, a next generation core (NGC) network, or another network, which could include components supporting an applicable RAT and could provide connectivity with at least one transport network 20, such as the Internet.

In an example implementation as shown, the core network 20 includes a serving gateway (SGW) 22, a packet data network gateway (PGW) 24, and a mobility management entity (MME) 26. In practice, the access node 12 could have an interface with the SGW 22 and an interface with the MME 26, the MME 26 could have an interface with the SGW 22, the SGW 22 could have an interface with the PGW 24, and the PGW 24 could provide connectivity with the transport network. With this arrangement, the SGW 22 and PGW 24 could cooperatively provide user-plane connectivity between the access node and the transport network, to enable the UE when served by the access node 12 to engage in communication on the transport network. And the MME 26 could operate as a controller to carry out operations such as coordinating UE attachment and setup of user-plane bearers.

Each of the carriers 14 on which the access node operates could be an FDD carrier or a TDD carrier. Further, each carrier could be defined within an industry specified frequency band such as one of those noted above, by its frequency channel(s) being defined within the frequency band.

As further noted above, the air interface on each such carrier could be configured to define various air-interface resources. Without limitation, for instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier could be divided into subcarriers with a subcarrier spacing on the order of 15 to 240 kHz.

With this arrangement, the air interface on each carrier would define an array of resource elements as noted above. And as indicated above, the resource elements per subframe could be grouped to define allocable PRBs, while certain resource elements could be reserved for special purposes, such as to carry synchronization signals, broadcast messages, and reference signals from the access node to UEs within coverage of the carrier. Access node 12 and UE 16 could be preconfigured to operate on the carrier accordingly.

Also without limitation, for instance, the access node could broadcast synchronization signals in a predefined group of resource elements centered on the carrier's downlink bandwidth in certain subframes per frame, and the UE could detect presence of coverage on the carrier and establish frame timing by scanning for and finding the synchronization signals at the carrier's center frequency. Further, the access node could broadcast a reference signal in resource elements distributed in a predefined pattern throughout each downlink subframe of the carrier, and the UE could measure strength of the reference signal (e.g., reference signal receive power (RSRP)) as an indication of strength of the UE's coverage on the carrier.

Still further, also without limitation, the access node could periodically broadcast various system messages on a broadcast channel defined within a predefined group of resource elements centered on the carrier's downlink bandwidth, and the UE could read those broadcast system messages to obtain the system information. Examples of such broadcast system messages include a master information block (MIB), which could specify the carrier's bandwidth and other operational parameters related to service on the carrier, and various system information block (SIB) messages, which could specify other operational parameters related to service on the carrier.

The access node could structure the content of these broadcast system messages using standard encoding (e.g., per Abstract Syntax Notation One (ASN.1)), with discrete information elements being set forth as bit sequences (binary codewords) representing respective system information. A UE programmed with control logic that maps each of these bit sequences to their respective system information could thus read the broadcast system messages and interpret the information elements so as to obtain the system information and then operate accordingly.

By way of example, the access node could include in the MIB a binary codeword that represents the attribute "carrier bandwidth" together with a value specifying the carrier's bandwidth. And to learn this operational parameter, the UE could be programmed or otherwise configured with control logic that maps that binary codeword to the logical concept of "carrier bandwidth". Upon reading that binary codeword in the MIB broadcast by the access node, the UE could therefore determine that the accompanying value in the MIB is the bandwidth of the carrier. And having determined the carrier's bandwidth, the UE could then use the determined carrier bandwidth as a basis to read other signaling broadcast by the access node in relation to the bandwidth and to then operate accordingly.

In line with the discussion above, when UE enters into coverage of the access node, the UE could detect presence of the access node on a carrier 14. Having detected coverage on the carrier, the UE could then read one or more of the system messages broadcast by the access node on the carrier, in order to learn operational parameters related to service on the carrier. Further, the UE could evaluate the reference signal or the like broadcast by the access node on the carrier, to determine the UE's coverage strength on the carrier. And if the UE determines that the coverage strength is sufficient (e.g., at least as high as a predefined level), the UE could then proceed to connect with the access node on the carrier.

As noted above, the process of the UE connecting with the access node on the carrier could involve the UE and access node engaging in random-access signaling and RRC signaling with each other. For instance, the UE could first transmit to the access node a random-access preamble signifying the UE's desire to connect, the access node could responsively provide the UE with an initial uplink resource grant (e.g., uplink PRB allocation) for carrying an RRC connection request, and the UE could then accordingly transmit to the access node an RRC connection request. Through this and/or other signaling, the access node and UE could agree on establishment of an RRC connection on the carrier, defining a logical signaling connection between the access node and the UE, and the access node and UE could each make a record of that established RRC connection, so that the access node could then serve the UE in an RRC connected mode on the carrier.

In addition, once the UE is connected with the access node, the UE may engage in attach signaling with the MME 26 to register for service if appropriate. For instance, the UE could transmit to the MME via the access node an attach request. And after authenticating the UE, the MME could coordinate setup for the UE of one or more bearers extending between the UE and the PGW 24, so as to enable the UE to engage in packet-data communication on the transport network 20. Each such bearer could include a data radio bearer (DRB) portion extending over the air interface on the carrier between the UE and the access node and an access-bearer portion extending via the SGW 22 between the access node and the PGW.

Once the UE is connected and attached in the example arrangement, the access node could then serve the UE with packet-data communications as noted above.

For instance, when the access node receives data to transmit to the UE, the access node could allocate one or more downlink PRBs in a subframe for use to transmit at least a portion of the data, defining a transport block, to the UE. The access node could then transmit to the UE a Downlink Control Information (DCI) message that designates the PRBs, and the access node could accordingly transmit the transport block to the UE in those designated PRBs. And when the UE has data to transmit to the access node (e.g., for transmission on the transport network), the UE could transmit to the access node a scheduling request that carries with it a buffer status report (BSR) indicating how much data the UE has buffered for transmission. And in response, the access node could allocate one or more uplink PRBs in an upcoming subframe for carrying a transport block of that data from the UE and could transmit to the UE a DCI message that designates those upcoming PRBs, and the UE could then accordingly transmit the transport block to the access node in the designated PRBs.

In line with the discussion above, the present disclosure provides for controlling (e.g., restricting) UE connectivity with the access node in a scenario where the UE does not support a particular service feature of the access node that may be deemed critical to service. As noted above, this mechanism could be implemented with respect to various service features.

Without limitation, for instance, the mechanism could be applied in a scenario where the carrier at issue is configured with a subcarrier shift between its downlink and uplink but where the UE is not programmed to understand that feature, perhaps because the UE is a legacy UE that includes no control logic related to the feature.

This example scenario could arise, for instance, if the carrier is a TDD carrier defined in a particular frequency band and if the carrier has the same subcarrier spacing on its downlink and its uplink but with the subcarriers on the uplink being shifted in frequency from the subcarriers on the downlink. For example, the TDD carrier might be configured with subcarriers spaced every 15 kHz on both the downlink and the uplink, but the frequency position of those subcarriers on the uplink might be offset from the frequency position of those subcarriers on the downlink by 7.5 kHz. Thus, if the TDD carrier bandwidth is divided into 7.5 kHz frequency points, the downlink might be configured with subcarriers on the odd numbered 7.5 kHz frequency points, but the uplink might be configured with subcarriers on the even numbered 7.5 kHz frequency points. This subcarrier shift between downlink and uplink might be technically beneficial for one or more reasons, the specifics of which are not pertinent.

With such a carrier configuration, the access node would provide its downlink transmissions on resource elements at the downlink subcarriers, in accordance with the subcarrier positioning on the downlink, and a UE should be able to receive those transmissions accordingly. Further, the UE would provide its uplink transmissions on resource elements at the uplink subcarriers, in accordance with the subcarrier positioning on the uplink, and the access node would be able to those transmissions accordingly.

The access node could be configured to treat the carrier in this manner, operating in accordance with the downlink-uplink subcarrier shift.

Further, the access node could include in one of its broadcast system messages on the carrier an information element that informs UEs in coverage of the access node on the carrier that the carrier has that downlink-uplink subcarrier shift. For instance, the access node could include in a SIB message a binary codeword that represents a "frequencyShift7p5khz-TDD" operational parameter, setting that parameter to "true".

If a UE that is in coverage of the access node on the carrier receives and reads this broadcast system message and the UE is programmed to understand that binary codeword (set to true) as being an indication that the carrier is configured with the downlink-uplink subcarrier shift, then the UE could responsively operate in accordance with the downlink-uplink subcarrier shift.

But UE 16 may not have such control logic. For instance, UE 16 may possess mapping data that maps each of various particular binary codewords to one or more associated operational-parameter constructs that the codeword represents so that the UE could determine from the mapping data what a particular binary codeword means. However, that mapping data may not encompass the binary codeword in included in the broadcast system message that corresponds with configuration of the carrier with the downlink-uplink subcarrier shift. Alternatively, in some other manner, the UE 16 may not possess mapping data and/or other such program logic that establishes that the binary codeword included in the broadcast system message corresponds with configuration of the carrier with the downlink-uplink subcarrier shift.

Therefore, when the UE receives and reads the broadcast system message, the UE would be unable to configure the carrier with the downlink-uplink subcarrier shift—as the UE would not know that it should. As a result, the UE's transmissions on the uplink may not have the 7.5kHz shifting in relation to the subcarriers on the downlink. In some situations, this may create interference and other issues that are undesirable. Therefore, it may be better for the UE in this situation to not even attempt connection with the access node on the carrier.

In line with the discussion above, the present disclosure provides for helping to prevent the UE from connecting with the access node on the carrier in this example scenario by making the above-noted use of NS signaling broadcast in a SIB message or the like.

Figure 2:
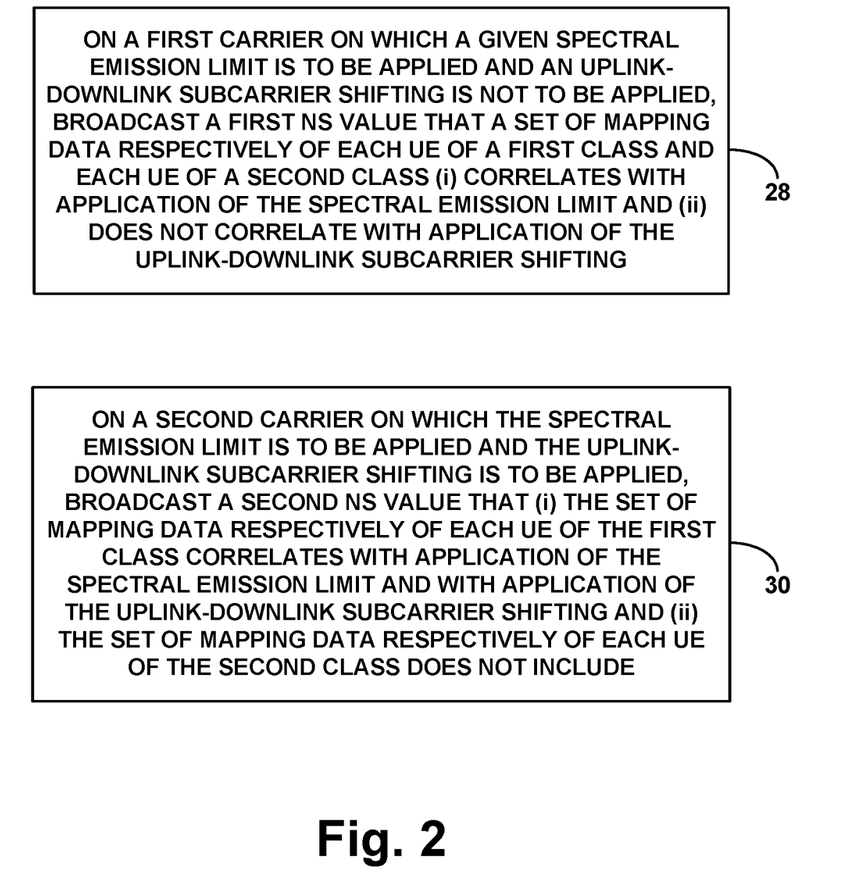
FIG. 2 is a depiction of method steps that could be carried out in accordance with the present disclosure.

FIG. 2 is a depiction of example method steps for use of NS signaling to cooperatively control application of a given spectral emission limit and application of uplink-downlink subcarrier shifting. As discussed above, this method could apply in a wireless communication system that supports serving a plurality of UEs including a first class of UEs and a second class of UEs, where each UE of the plurality is programmed with a respective set of mapping data (e.g., a table of data and/or executable program instructions) that correlates each of multiple NS values respectively with application of an associated spectral emission limit, and where each UE is configured such that, when the UE is within coverage of the system on a carrier, the UE receives one or more NS values broadcast by the system on the carrier and (i) if the UE's respective set of mapping data includes at least a given one of the received one or more NS values and the UE connects with the system on the carrier, then the UE applies the spectral emission limit that the UE's respective set of mapping data correlates with a given NS value supports and (ii) if the UE's respective set of mapping data does not include any of the received one or more NS values, then the UE avoids connecting with the access node on the carrier. The method steps of FIG. 2 are not shown in flow-chart form, as the method steps could be carried out in parallel with each other or in sequence.

As shown in FIG. 2, at block 28, the method includes, on a first carrier on which the given spectral emission limit is to be applied and the uplink-downlink subcarrier shifting is not to be applied, the system broadcasting a first NS value that the set of mapping data respectively of each UE of the first class and each UE of the second class (i) correlates with application of the spectral emission limit and (ii) does not correlate with application of the uplink-downlink subcarrier shifting. And at block 30, the method includes, on a second carrier on which the spectral emission limit is to be applied and the uplink-downlink subcarrier shifting is to be applied, broadcasting by the system a second NS value that (i) the set of mapping data respectively of each UE of the first class correlates with application of the spectral emission limit and with application of the uplink-downlink subcarrier shifting and (ii) the set of mapping data respectively of each UE of the second class does not include.

As discussed above, this method could be carried out by an access node, such as access node 12 for instance, in which case the connecting with the system could involve connecting with the access node and the system broadcasting the first and second NS values could involve the access node broadcasting the first and second NS values. Further, broadcasting the first and second NS values could involve broadcasting the first and second NS values in a SIB message.

In addition, as discussed above, the uplink-downlink subcarrier shifting could be 7.5 kHz subcarrier shifting, defining a subcarrier offset between downlink and uplink communication, among other possibilities. And each UE of the second class could be a legacy UE, not supporting such subcarrier shifting. Further, the first NS value could be a value such as NS_01, NS_03, or NS_44.

Figure 3:
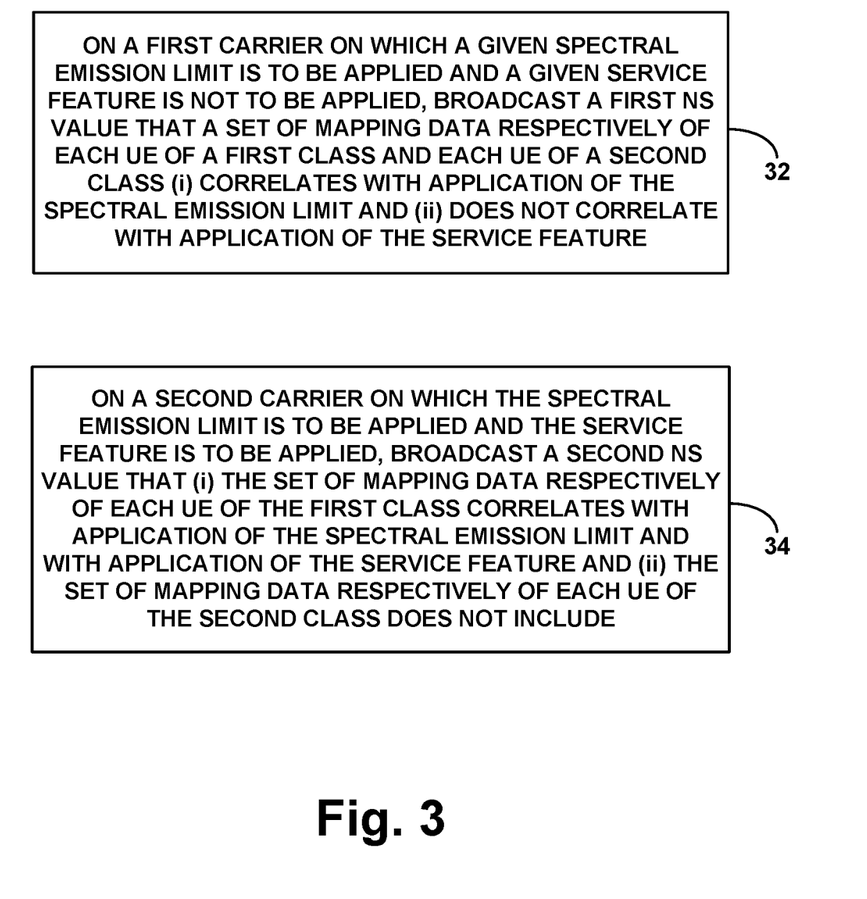
FIG. 3 is another depiction of method steps that could be carried out in accordance with the present disclosure.

FIG. 3 is next is a depiction of example method steps for use of NS signaling to cooperatively control application of a given spectral emission limit and application of a service feature. As discussed above, this method could apply in a wireless communication system that supports serving a plurality of UEs including a first class of UEs and a second class of UEs, where each UE of the plurality is programmed with a respective set of mapping data (e.g., a table of data and/or executable program instructions) that correlates each of multiple NS values respectively with application of an associated spectral emission limit, and where each UE is configured such that, when the UE is within coverage of the system on a carrier, the UE receives one or more NS values broadcast by the system on the carrier and (i) if the UE's respective set of mapping data includes at least a given one of the received one or more NS values and the UE connects with the system on the carrier, then the UE applies the spectral emission limit that the UE's respective set of mapping data correlates with a given NS value supports and (ii) if the UE's respective set of mapping data does not include any of the received one or more NS values, then the UE avoids connecting with the access node on the carrier. The method steps of FIG. 3, as with those of FIG. 2, are not shown in flow-chart form, as the method steps could be carried out in parallel with each other or in sequence.

As shown in FIG. 3, at block 32, the method includes, on a first carrier on which the given spectral emission limit is to be applied and the service feature is not to be applied, broadcasting by the system a first NS value that the set of mapping data respectively of each UE of the first class and each UE of the second class (i) correlates with application of the spectral emission limit and (ii) does not correlate with application of the service feature. And at block 34, the method includes, on a second carrier on which the spectral emission limit is to be applied and the service feature is to be applied, broadcasting by the system a second NS value that (i) the set of mapping data respectively of each UE of the first class correlates with application of the spectral emission limit and with application of the service feature and (ii) the set of mapping data respectively of each UE of the second class does not include.

In line with the discussion above, this method could be implemented by an access node, such as access node 12 for instance, in which case the connecting with the system could involve connecting with the access node and the broadcasting by the system of the first and second NS values could involve the access node broadcasting the first and second NS values. Further, the broadcasting of the first and second NS values could involve broadcasting the first and second NS values in a system information broadcast (SIB) message. And the first NS value could be a value such as NS_01, NS_03, or NS_44.

Still further, as noted above, each UE of the second class could be a legacy UE. And the mapping data could include, without limitation, data such as a table of data and/or executable program instructions.

Figure 4:
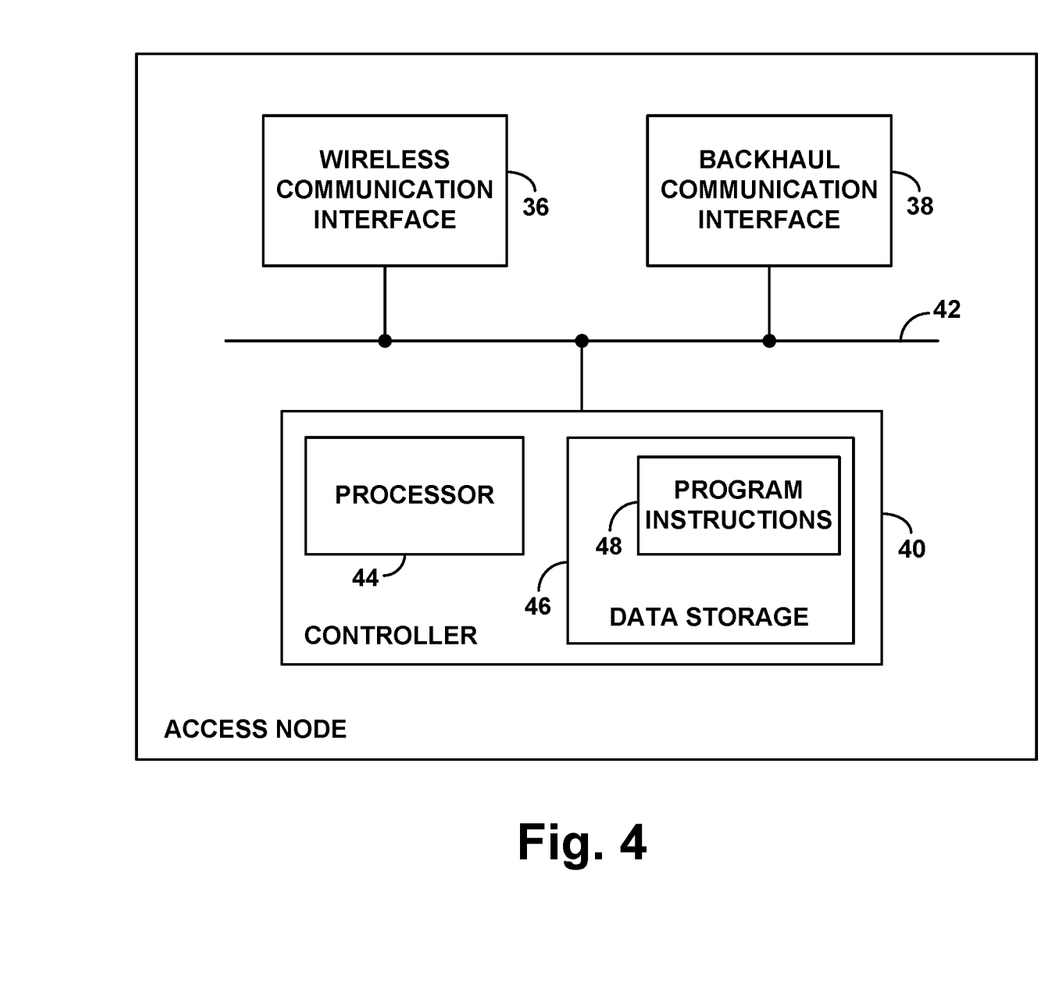
FIG. 4 is a simplified block diagram of an access node operable in accordance with the present disclosure.

FIG. 4 is next a simplified block diagram of an example access node that could be configured to carry out various features described herein. As shown in FIG. 4, the example access node includes a wireless communication interface 36, a backhaul communication interface 38, and a controller 40, all of which could be integrated together and/or communicatively linked together by a system bus, network, or other connection mechanism 42.

In an example implementation, the wireless communication interface 38 could support air-interface communication on various carriers, and the wireless communication interface could therefore comprise an antenna structure, which could be tower mounted or could take other forms, and associated components such as a power amplifier and a wireless transceiver, so as to enable the access node to serve UEs on such a carrier. And the backhaul communication interface 38 could comprise a wired or wireless communication module, such as an Ethernet network communication module and associated logic, through which the first access node could engage in backhaul communication with various other network entities including core-network entities for instance.

Further, the controller 40 could be configured to carry out various operations described herein, such as the operations described above in connection with FIGS. 2 and 3, for use of NS signaling to cooperatively control application of a service feature other than spectral emission limiting, such as uplink-downlink subcarrier shifting for instance. For instance, as shown, the controller 48 could include at least one processor 44, such as one or more general purpose processors (e.g., microprocessors) and/or one or more specialized processors, and a non-transitory data storage 46 (e.g., one or more volatile and/or non-volatile storage components (e.g., magnetic, optical, or flash storage, necessarily non-transitory)) storing program instructions 48 executable by the at least one processor 44 to carry out those operations (e.g., to cause the first access node to carry out the operations).

Various other features described herein can be implemented in this context as well, and vice versa.

Figure 5:
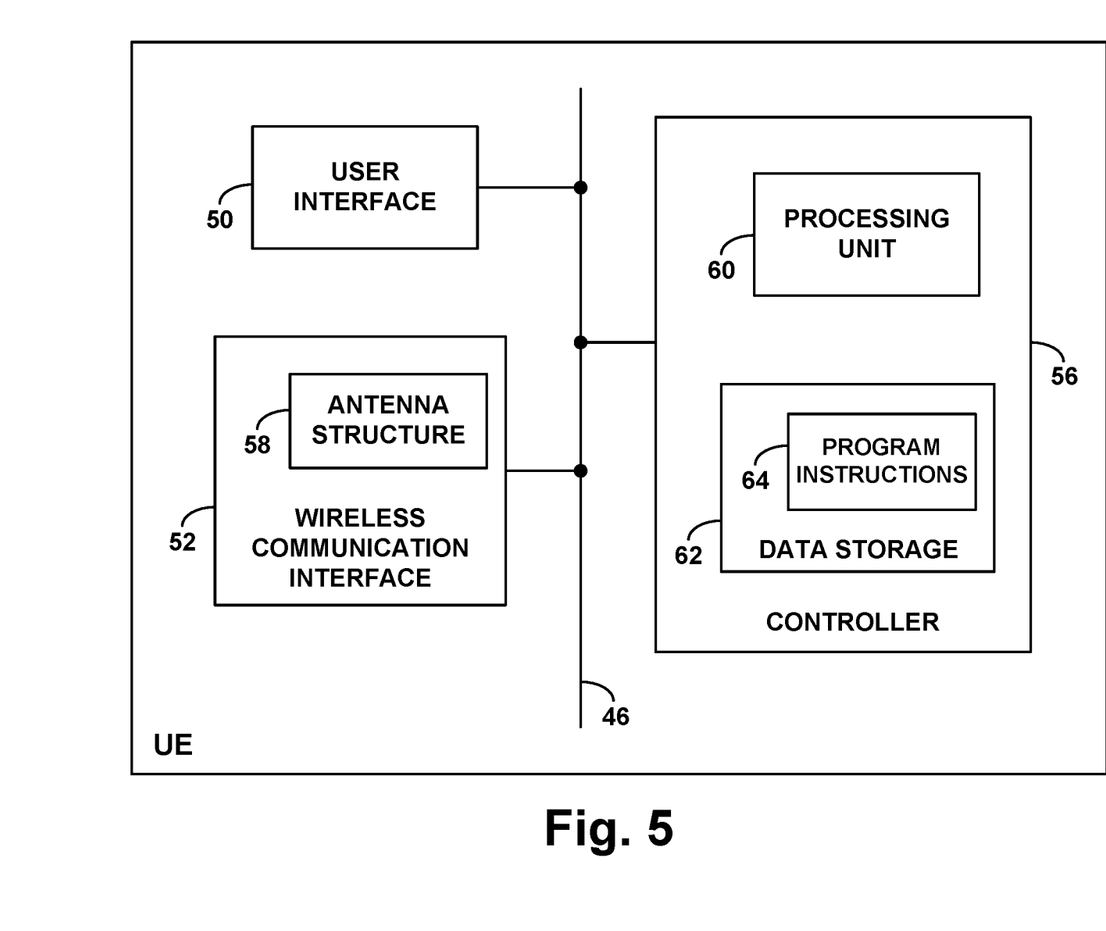
FIG. 5 is a simplified block diagram of an example UE operable in accordance with the present disclosure.

FIG. 5 is next a simplified block diagram of a UE that could be configured to carry out various UE operations described herein. A shown, the example UE includes a user interface 50, a wireless communication interface 52, and a controller 54, all of which could be communicatively linked together by a system bus, network, or other connection mechanism 56 and/or could be integrated together or distributed in various ways.

In this example arrangement, the user interface 50 (which might be omitted if the UE is not user operated) could include input and output components that facilitate user interaction with the UE. And the wireless communication interface 52 could include one or more RF chains and associated logic to support communication according to one or more RATs, including an antenna structure 58 through which to engage in air-interface communication.

Further, controller 54 could comprise control logic to cause the UE to carry out particular UE operations described herein. For instance, the controller 54 could include at least one processor 60 including one or more processors (e.g., general purpose microprocessors and/or dedicated processing units), non-transitory data storage 62 (e.g., one or more volatile and/or non-volatile storage components, such as magnetic, optical, or flash storage (necessarily non-transitory)), and program instructions 64 stored in the non-transitory data storage and executable by the processor 60 to cause the UE to carry out the operations.

Various features described above can be implemented in this context as well, and vice versa.

Further, the present disclosure also contemplates at least one non-transitory computer readable medium encoded with or otherwise embodying program instructions executable by at least one processing unit to carry out various operations as described herein.

Exemplary embodiments have been described above. Those skilled in the art will understand, however, that changes and modifications may be made to these embodiments without departing from the true scope and spirit of the invention.

What is claimed is:

1. In a wireless communication system that supports serving a plurality of UEs including a first class of UEs and a second class of UEs, wherein each UE of the plurality is programmed with a respective set of mapping data that correlates each of multiple network signaling (NS) values respectively with application of an associated spectral emission limit, and wherein each UE is configured such that, when the UE is within coverage of the system on a carrier, the UE receives one or more NS values broadcast by the system on the carrier and (i) if the UE's respective set of mapping data includes at least a given one of the received one or more NS values and the UE connects with the system on the carrier, then the UE applies the spectral emission limit that the UE's respective set of mapping data correlates with a given NS value supports and (ii) if the UE's respective set of mapping data does not include any of the received one or more NS values, then the UE avoids connecting with the system on the carrier,
   a method for use of NS signaling to cooperatively control application of a given spectral emission limit and application of uplink-downlink subcarrier shifting, the method comprising:
   on a first carrier on which the given spectral emission limit is to be applied and the uplink-downlink subcarrier shifting is not to be applied, broadcasting by the system a first NS value that the set of mapping data respectively of each UE of the first class and each UE of the second class (i) correlates with application of the spectral emission limit and (ii) does not correlate with application of the uplink-downlink subcarrier shifting; and
   on a second carrier on which the spectral emission limit is to be applied and the uplink-downlink subcarrier shifting is to be applied, broadcasting by the system a second NS value that (i) the set of mapping data respectively of each UE of the first class correlates with application of the spectral emission limit and with application of the uplink-downlink subcarrier shifting and (ii) the set of mapping data respectively of each UE of the second class does not include.

2. The method of claim 1, wherein the method is implemented by an access node, wherein the connecting with the system comprises connecting with the access node and the broadcasting by the system of the first and second NS values comprises the access node broadcasting the first and second NS values.

3. The method of claim 2, wherein broadcasting the first and second NS values comprises broadcasting the first and second NS values in a system information broadcast (SIB) message.

4. The method of claim 1, wherein the uplink-downlink subcarrier shifting is 7.5 kHz subcarrier shifting, defining a subcarrier offset between downlink and uplink communication.

5. The method of claim 1, wherein the first NS value is selected from the group consisting of NS_01, NS_03, and NS_44.

6. The method of claim 1, wherein each UE of the second class is a legacy UE.

7. The method of claim 1, wherein the mapping data comprises data selected from the group consisting of a table of data and executable program instructions.

8. In a wireless communication system that supports serving a plurality of UEs including a first class of UEs and a second class of UEs, wherein each UE of the plurality is programmed with a respective set of mapping data that correlates each of multiple network signaling (NS) values respectively with application of an associated spectral emission limit, and wherein each UE is configured such that, when the UE is within coverage of the system on a carrier, the UE receives one or more NS values broadcast by the system on the carrier and (i) if the UE's respective set of mapping data includes at least a given one of the received one or more NS values and the UE connects with the system on the carrier, then the UE applies the spectral emission limit that the UE's respective set of mapping data correlates with a given NS value supports and (ii) if the UE's respective set of mapping data does not include any of the received one or more NS values, then the UE avoids connecting with the system on the carrier,
   a method for use of NS signaling to cooperatively control application of a service feature other than spectral emission limiting, the method comprising:
      on a first carrier on which the given spectral emission limit is to be applied and the service feature is not to be applied, broadcasting by the system a first NS value that the set of mapping data respectively of each UE of the first class and each UE of the second class (i) correlates with application of the spectral emission limit and (ii) does not correlate with application of the service feature; and
      on a second carrier on which the spectral emission limit is to be applied and the service feature is to be applied, broadcasting by the system a second NS value that (i) the set of mapping data respectively of each UE of the first class correlates with application of the spectral emission limit and with application of the service feature and (ii) the set of mapping data respectively of each UE of the second class does not include.

9. The method of claim 8, wherein the method is implemented by an access node, wherein the connecting with the system comprises connecting with the access node and the broadcasting by the system of the first and second NS values comprises the access node broadcasting the first and second NS values.

10. The method of claim 9, wherein broadcasting the first and second NS values comprises broadcasting the first and second NS values in a system information broadcast (SIB) message.

11. The method of claim 8, wherein the first NS value is selected from the group consisting of NS_01, NS_03, and NS_44.

12. The method of claim 8, wherein each UE of the second class is a legacy UE.

13. The method of claim 8, wherein the mapping data comprises data selected from the group consisting of a table of data and executable program instructions.

14. An access node operable in a wireless communication system, wherein the wireless communication system supports serving a plurality of UEs including a first class of UEs and a second class of UEs, wherein each UE of the plurality is programmed with a respective set of mapping data that correlates each of multiple network signaling (NS) values respectively with application of an associated spectral emission limit, and wherein each UE is configured such that, when the UE is within coverage of the system on a carrier, the UE receives one or more NS values broadcast by the system on the carrier and (i) if the UE's respective set of mapping data includes at least a given one of the received one or more NS values and the UE connects with the system on the carrier, then the UE applies the spectral emission limit that the UE's respective set of mapping data correlates with a given NS value supports and (ii) if the UE's respective set of mapping data does not include any of the received one or more NS values, then the UE avoids connecting with the system on the carrier, the access node comprising:
   a wireless communication interface supporting air-interface communication, wherein the wireless communication interface includes an antenna structure;
   a backhaul communication interface; and
   a controller configured to cause the access node to carry out operations for use of NS signaling to cooperatively control application of a given spectral emission limit and application of a service feature other than spectral emission limiting, wherein the controller comprises at least one processor, non-transitory data storage, and program instructions stored in the non-transitory data storage and executable by the at least one processor to carry out the operations, and wherein the operations include:
      on a first carrier on which the given spectral emission limit is to be applied and the service feature is not to be applied, broadcasting a first NS value that the set of mapping data respectively of each UE of the first class and each UE of the second class (i) correlates with application of the spectral emission limit and (ii) does not correlate with application of the service feature, and
      on a second carrier on which the spectral emission limit is to be applied and the service feature is to be applied, broadcasting a second NS value that (i) the set of mapping data respectively of each UE of the first class correlates with application of the spectral emission limit and with application of the service feature and (ii) the set of mapping data respectively of each UE of the second class does not include.

15. The access node of claim 14, wherein the service feature comprises uplink-downlink subcarrier shifting.

16. The access node of claim 15, wherein broadcasting the first and second NS values comprises broadcasting the first and second NS values in a system information broadcast (SIB) message.

17. The access node of claim 15, wherein the uplink-downlink subcarrier shifting is 7.5 kHz subcarrier shifting, defining a subcarrier offset between downlink and uplink communication.

18. The access node of claim 15, wherein the first NS value is selected from the group consisting of NS_01, NS_03, and NS_44.

19. The access node of claim 15, wherein each UE of the second class is a legacy UE.

20. The access node of claim 15, wherein the mapping data comprises data selected from the group consisting of a table of data and executable program instructions.

\* \* \* \* \*